United States Patent [19]
MacDonald

[11] Patent Number: 6,147,799
[45] Date of Patent: Nov. 14, 2000

[54] PHYSICALLY COMPACT VARIABLE OPTICAL DELAY ELEMENT HAVING WIDE ADJUSTMENT RANGE

[75] Inventor: Willard MacDonald, San Francisco, Calif.

[73] Assignee: Agilent Technologies Inc., Palo Alto, Calif.

[21] Appl. No.: 09/415,279

[22] Filed: Oct. 8, 1999

[51] Int. Cl.[7] .............................. G02B 21/00; G02B 5/08
[52] U.S. Cl. ........................... 359/380; 359/857; 359/861
[58] Field of Search ................................ 359/362–366, 359/434–435, 641, 857–861, 726–731

[56] References Cited

U.S. PATENT DOCUMENTS

| | | | |
|---|---|---|---|
| 3,741,622 | 6/1973 | Cox | 359/364 |
| 4,103,991 | 8/1978 | Kramer | 359/861 |
| 5,146,368 | 9/1992 | Fink | 359/861 |
| 5,220,463 | 6/1993 | Edelstein | 359/857 |
| 6,003,997 | 12/1999 | Downes, Jr. | 359/857 |

FOREIGN PATENT DOCUMENTS 129040  1/1960  Russian Federation ............... 359/380

*Primary Examiner*—Thong Nguyen
*Attorney, Agent, or Firm*—John L. Imperato

[57] ABSTRACT

A variable optical delay element that is physically compact introduces time delays to an applied optical signal. The variable optical delay element includes a pair of substantially parallel members, each having a linear reflective surface facing the reflective surface of the other member. An input lens secured to a first end of the first linear member collimates an optical beam launched by an input fiber while an output lens secured to a second member focuses the collimated optical beam onto an optical output fiber. A first actuator adjusts the offset relationship between the members in a direction parallel to the pair of members to designate the number of reflections of the collimated optical beam by the reflective surfaces before being received by the output lens. A second actuator adjusts the distance separating the linear reflectors. The optical signal is delayed by a predefined time interval by adjusting the offset positions of the members and the distance separating the members.

11 Claims, 3 Drawing Sheets

PHYSICALLY COMPACT VARIABLE OPTICAL DELAY ELEMENT HAVING WIDE ADJUSTMENT RANGE

BACKGROUND OF THE INVENTION

Adjustable time delays are introduced into optical signals that are present in a variety of optical networks and systems. For example, delays of the optical signals within routers, switches and multiplexers may be adjusted to equalize propagation path lengths for the purpose of synchronizing signals within an optical network. Alternatively, progressively adjusted time delays introduced to the optical signals within sampling systems, such as equivalent time oscilloscopes, enable high-bandwidth signals to be accurately represented by the systems. Adjusting the delays of the optical signals in these networks and systems is achieved using variable optical delay elements.

Variable optical delay elements, such as the ODL-320/620 optical delay line module available from SANTEC Corp., use a pair of fiber collimators and a reflection mirror to introduce adjustable time delays to applied optical signals. These types of variable optical delay elements introduce precisely-controllable time delays, but have a narrow adjustment range, for example, from 0 to 300 picoseconds. Widening the adjustment range of this type of variable optical delay element requires increasing the propagation path length of the optical signals within the delay element. However, increasing the propagation length causes the physical dimensions of the delay element to correspondingly increase. Other types of variable optical delay elements, such as those based on index varying materials, or pivoting high-index slabs, are physically compact but they also have narrow delay adjustment ranges. There is a need for a physically compact variable optical delay element that introduces time delays to an applied optical signal over a wide adjustment range.

SUMMARY OF THE INVENTION

A physically compact, variable optical delay element constructed according to the preferred embodiment of the present invention introduces adjustable time delays to an applied optical signal and has both wide adjustment range and high resolution. The variable optical delay element includes a pair of substantially parallel members, each having a linear reflective surface that faces the reflective surface of the other member. An input lens secured to the first member collimates an optical beam launched by an input fiber carrying the applied optical signal. An output lens secured to the second member focuses the collimated optical beam onto an optical output fiber. A first actuator coupled to at least one of the members adjusts the offset relationship between the members in a direction parallel to the pair of members to designate the number of times that the collimated optical beam is reflected by the reflective surfaces before being received by the output lens. A second actuator coupled to at least one of the members adjusts the distance separating the members. The optical signal is delayed by an adjustable time interval by adjusting the offset relationship of the members and by adjusting the distance separating the members.

DETAILED DESCRIPTION OF THE PREFERRED EMBODIMENT

Figure 1A:
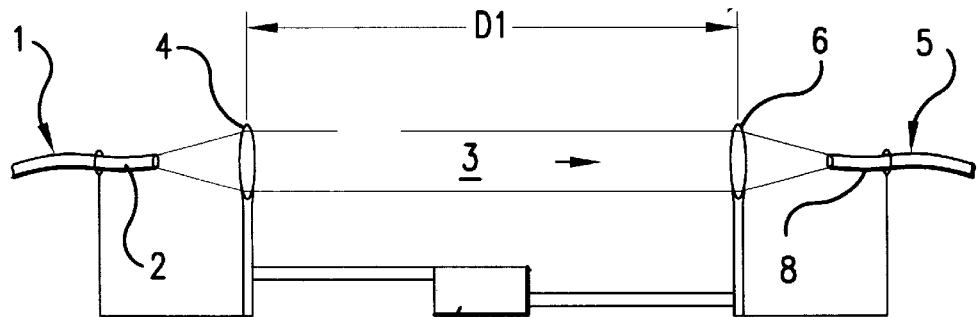
FIGS. 1A–1C show prior art variable optical delay elements.
Figure 1B:
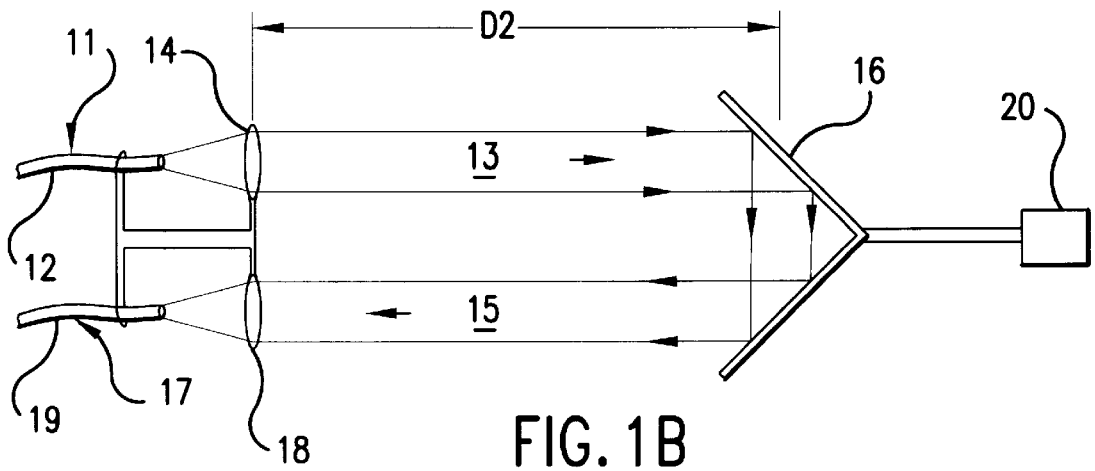
Figure 1C:
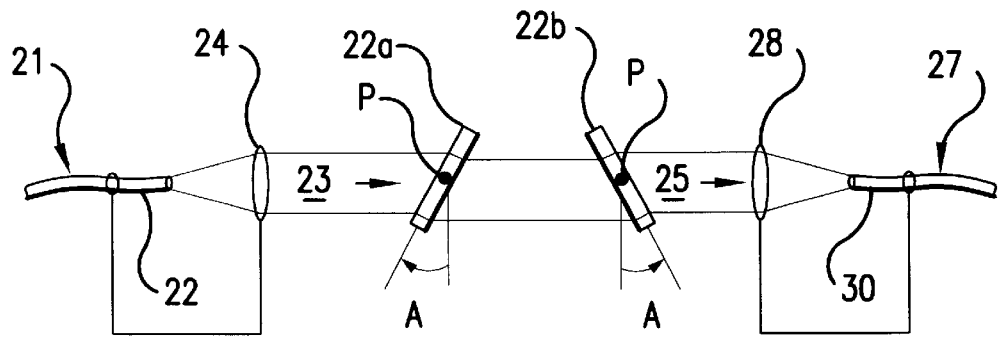

FIGS. 1A–1C show prior art variable optical delay elements. An adjustable time delay is introduced to an applied optical signal by corresponding adjustments of the propagation path length of the optical signal within the variable optical delay elements. In the prior art variable optical delay element shown in FIG. 1A, an applied optical signal 1 is launched by an optical input fiber 2 and intercepted by an input lens 4 that collimates the launched optical signal into an optical beam 3. The optical beam 3 is then intercepted by an output lens 6 that refocuses the optical beam 3 into an output optical signal 5 on an optical output fiber 8. A linear actuator 10 mechanically coupled at least one of the lenses 4, 6 adjusts the physical distance D1 between the input lens 4 and the output lens 6. The input fiber 2 is held in a fixed spatial relationship to the input lens 4 and the output fiber 8 is held in a fixed spatial relationship to the output lens 6. By adjusting this distance D1, the propagation path length of the optical beam 3 is correspondingly varied, thereby introducing an adjustable time delay between the applied optical signal 1 and the output signal 5. The overall physical length of the variable optical delay element depends directly on the distance D1. Therefore, as the distance D1 is increased to widen the adjustment range of the variable optical delay element, the overall physical length of the variable optical delay element increases in a one-to-one correspondence to that adjustment range. For example, in the prior art variable optical delay element shown in FIG. 1A, a time delay range of 2 nanoseconds requires that the distance DI be adjustable over a 60 centimeter range.

In the prior art variable optical delay element shown in FIG. 1B, an applied optical signal 11 is launched by an optical input fiber 12 and intercepted by an input lens 14 that collimates the launched optical signal into an optical beam 13. The optical beam 13 is then incident upon a retroreflector 16 that reflects this incident optical beam 13 into a reflected optical beam 15, that is parallel to the incident optical beam 13 and offset from the beam 13. The reflected optical beam 15 is then intercepted by an output lens 18 that refocuses the reflected optical beam 15 into an optical output signal 17 on an optical output fiber 19. A linear actuator 20 mechanically coupled to the retroreflector 16 adjusts the physical distance D2 between the input lenses 14, 18 and the retroreflector 16. By adjusting this distance D2, the propagation path length of the optical beams 13, 15 is varied, thereby introducing an adjustable time delay between the applied optical signal 11 and the output optical signal 17. The overall physical length of the variable optical delay element depends directly on the distance D2. However, in this variable optical delay element, as the distance D2 is increased to widen the adjustment range of the variable optical delay element, the overall physical length of the variable optical delay element increases in a one half-to-one correspondence to that adjustment range. For the prior art variable optical delay element shown in FIG. 1B, a time delay range of 2 nanoseconds requires that the distance D2 be adjustable over a 30 centimeter range.

In the prior art variable optical delay element shown in Figure IC, variable time delays are introduced to an applied optical signal 21 by varying propagation path lengths through a pair of slabs 22a, 22b that have a higher optical index than the surrounding propagation medium. The applied optical signal 21 is launched by an optical input fiber 22 and intercepted by an input lens 24 that collimates the launched optical signal into an optical beam 23. The optical beam 23 is then incident upon a first slab 22a of the two slabs 22a, 22b that each have a pivot point P about which the slabs 22a, 22b are each rotatable. The time delay introduced to the incident optical beam 23 as a result of propagation through the slabs 22a, 22b increases as the angle of rotation A about pivot points P increases. In this example, the slabs are rotated by equal angles A, in opposite directions, so that a delayed optical beam 25 emerges from slab 22b axially aligned with the incident optical beam 23. The delayed optical beam 25 is then intercepted by an output lens 28 that refocuses the optical beam 25 into an optical output signal 27 on an optical output fiber 30. A rotating stepper motor (not shown) mechanically coupled to each of the slabs 22a, 22b adjusts the angle of rotation A about each of the pivot points P so the propagation path length of the optical beam 23 through the slabs 22a, 22b is correspondingly varied, thereby introducing an adjustable time delay between the applied optical signal 21 and the output optical signal 27. The variable optical delay element shown in FIG. 1C is physically compact, and the physical dimensions of the variable optical delay element are not dependent on adjustments of the time delay introduced to the applied optical signal 21. While this type of variable optical delay element has high resolution in the adjustable time delays introduced to the applied optical signal 21, the adjustment range of the delay element is limited by the difference in propagation path lengths through the slabs as the angle A is increased. A greater adjustment range is achieved when the rotatable slabs 22a, 22b are integrated into the variable time delay elements shown in FIGS. 1A or 1B to intercept the optical beams 23 within the propagation paths of those elements. However, this widening of the time delay adjustment range is at the expense of increased physical dimensions of the resulting variable optical delay element.

Figure 2A:
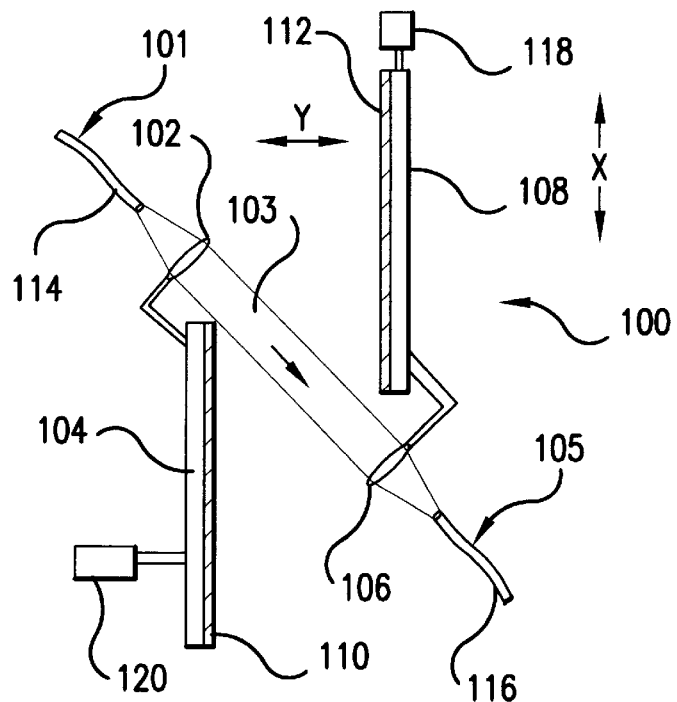
FIGS. 2A–2D show a variable optical delay element constructed according to the preferred embodiment of the present invention.
Figure 2B:
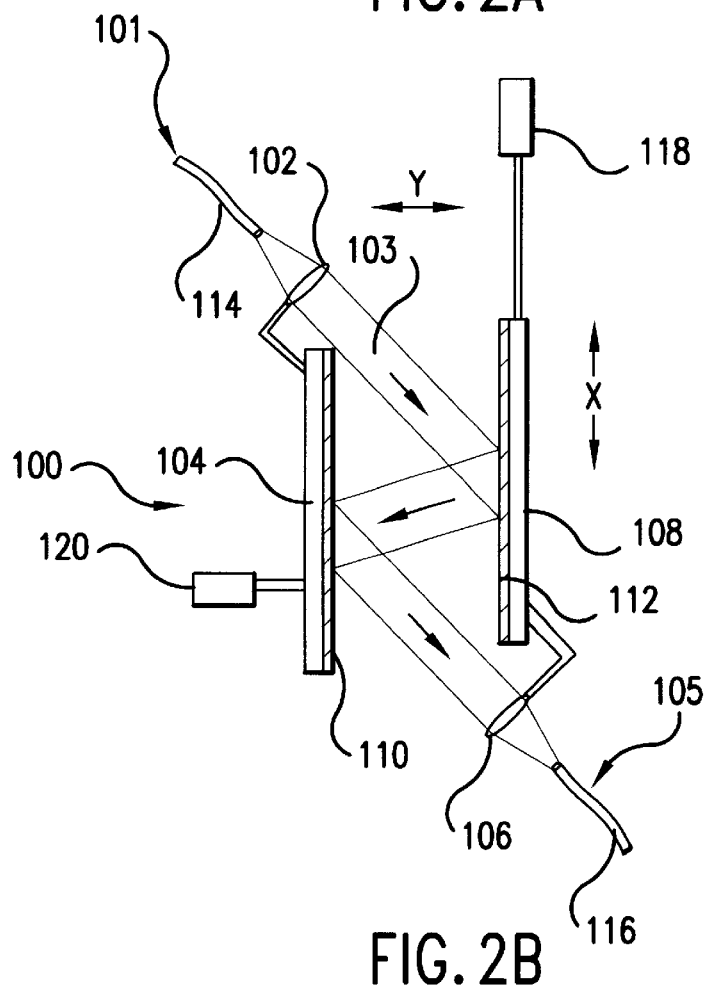
Figure 2C:
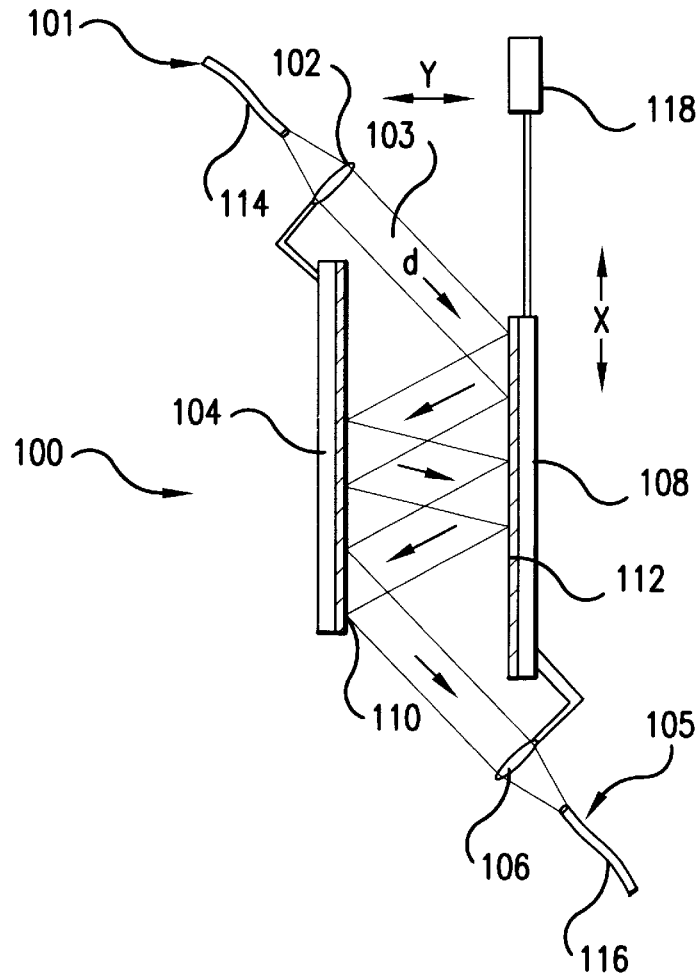

FIGS. 2A–2D show a variable optical delay element 100 constructed according to the preferred embodiment of the present invention. This variable optical delay element 100 introduces a variable time delay to an applied optical signal 101 by varying the propagation path length of an optical beam 103. An input lens 102 is secured to a first end of a first member 104 and an output lens 106 secured to the end of the second member 108 that is distal from the input lens 102. The first member 104 and the second member 108 each have a linear reflective surface 110, 112. The reflective surfaces 110, 112 are substantially parallel and face each other so that the optical beam 103 is capable of being reflected between the reflective surfaces 110, 112 as shown in FIGS. 2B and 2C.

In this example, the optical signal 101 applied to the variable optical delay element 100 is shown launched by an optical fiber 114, laser, LED, or other optical source, and is intercepted by the input lens 102 that collimates the launched optical signal into the optical beam 103. When the applied optical signal 101 is already in the form of a collimated optical beam 103 the input lens 102 and the input fiber 114 are typically not included in the variable optical delay element 100. The collimated optical beam 103 is intercepted by the output lens 106 that refocuses the optical beam 103 into an optical output signal 105 on an optical output fiber 116 or other optical element. A first mechanical actuator 118 coupled to the member 108 adjusts of the offset position of the member 108 relative to the member 104 in an axis direction X that is parallel to the members 104, 108. A second mechanical actuator 120 coupled to the member 104 provides for adjustment of the physical distance d separating the member 104 and the member 108, in an axis direction Y that is orthogonal to the members 104, 108. Alternatively, the first mechanical actuator 118 and the second mechanical actuator 120 are each coupled to either or both of the members 104, 108 to enable the relative offset position of the members 104, 108 and the physical distance between the members 104, 108 to be adjusted.

Time delay through the variable optical delay element 100 is adjusted in discrete steps by using the first actuator 118 to vary the number of times that the optical beam 103 is reflected by the reflective surfaces 110, 112. In FIG. 2A, for example, the actuator 118 positions member 108 so the optical beam 103 propagates directly from the input lens 102 to the output lens 106. In FIG. 2B, the actuator 118 positions the member 108 so that the optical beam 103 is incident on the reflective surface 112 and reflected to the reflective surface 110 before being intercepted by the output lens 106. In FIG. 2C, the actuator 118 adjusts the member 108 to a third position so that the optical beam 103 is reflected twice off of each of the reflective surfaces 110, 112. As the relative offset positions of the members 104, 108 are adjusted in the direction X using the actuator 118 to make the input lens 102 and the output lens 106 further apart, the number of reflections by the reflective surfaces 110, 112 correspondingly increases. As the number of reflections increases, the propagation path length of the optical beam 103 through the variable optical delay element 100 also increases, causing the time delay through the element 100 to increase.

Time delay through the variable optical delay element 100 is adjustable in a continuous manner by using the second actuator 120 to vary the distance d separating the reflective surface 110 of the member 104 and the reflective surface 112 of the member 108. When the optical beam 103 is intercepted directly from input lens 102 as shown in FIG. 2A, continuous time delay adjustment sensitivity of approximately 3.3 nanoseconds/sin $\theta$ per meter of change in distance d results, where $\theta$ is the angle of the optical beam 103 relative to the linear reflective surfaces 110, 112. The time delay adjustment sensitivity increases as the number of times the optical beam 103 is reflected by reflective surfaces 110, 112 increases.

Figure 2D:
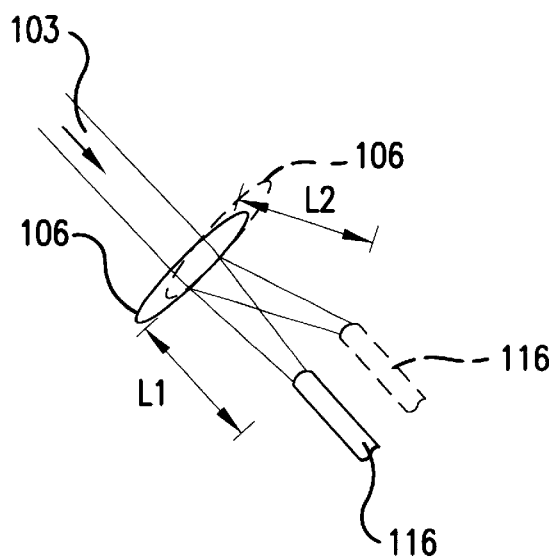

To achieve fine resolution in the adjustable time delay, the position of output lens 106 is offset relative to the intercepted optical beam 103 as shown in the detailed view of the optical beam 103 and output lens 106 in FIG. 2D. The optical beam 103 is shown intercepted with the output lens 106 at two different positions, as controlled by adjusting in the position of the member 108 using the actuator 118. Although the positional relationship between the output lens 106 and the output fiber 116 remains fixed, the propagation path length between the output lens 106 and the output fiber 116 changes as a result of the optical beam 103 being intercepted at different offset positions of the output lens 106. For example, when the optical beam 103 is centered in the output lens 102, a propagation path length L1 results. When the output lens 106 is offset relative to the optical beam 103, a propagation path length L2 results. In this example, propagation path length L2 is greater than the propagation path length L1, which results in a corresponding increase in the time delay introduced to the optical beam 103. Alternatively, the offset positioning of the optical beam 103 relative to the output lens 106 is varied to change the propagation path length between the output lens 106 and the output fiber 116 by slight adjustments of the offset position of the input lens 102, or the collimated optical beam 103 when the input lens 102 is not present.

The variable optical delay element 100 adjustably delays an applied optical signal 101 over a wide time delay range. The delay element 100 is physically compact due to multiple reflections of the collimated optical beam 103 between the linear reflective surfaces 110, 112. Continuous adjustment of the time delay is achieved via continuous adjustment of the distance d separating the linear reflective surfaces 110, 112. Fine delay adjustment having high resolution is achieved by varying the relative offset positions of the collimated optical beam 103 and the output lens 106.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. A delay element for delaying a collimated optical beam by an adjustable time interval, comprising:
   - a pair of substantially parallel linear reflectors, each reflector facing the other reflector,
   - an output lens secured to an end of a first linear reflector of the pair of linear reflectors, coupling the collimated optical beam to an output element,
   - a first actuator coupled to at least one of the linear reflectors in the pair of linear reflectors, adjusting an offset relationship between the linear reflectors in a direction parallel to the pair of linear reflectors, the offset adjustment designating the number of reflections of the collimated optical beam by the reflectors before being received by the output lens; and
   - a second actuator coupled to at least one of the linear reflectors in the pair of linear reflectors, adjusting a distance between the linear reflectors, whereby the offset relationship of the linear reflectors and the distance separating the linear reflectors are adjusted to delay the optical beam by a predefined time interval.

2. The delay element of claim 1 further comprising an input lens secured to an end of the second linear reflector that is distal from the end of the first linear reflector to which the output lens is secured, the input lens providing the collimating optical beam from an optical source.

3. The delay element of claim 2 wherein the optical source includes an input fiber launching an optical signal to be intercepted by the input lens.

4. The delay element of claim 3 wherein the output element includes an optical fiber.

5. The delay element of claim 2 wherein a relative position of the collimated optical beam and the output lens provides adjustment of the propagation path length between the output lens and the output element to adjust time delay of the optical beam.

6. The delay element of claim 5 wherein the relative position of the collimated optical beam and the output lens are adjusted by positioning the first linear reflector using the first actuator.

7. The delay element of claim 5 wherein the output element includes an optical fiber.

8. The delay element of claim 1 wherein a relative position of the collimated optical beam and the output lens provides adjustment of the propagation path length between the output lens and the output element to adjust time delay of the optical beam.

9. The delay element of claim 8 wherein the relative position of the collimated optical beam and the output lens are adjusted by positioning the first linear reflector using the first actuator.

10. The delay element of claim 9 wherein the output element includes an optical fiber.

11. The delay element of claim 8 wherein the output element includes an optical fiber.

* * * * *